United States Patent [19]
Honkawa et al.

[11] B 3,924,949
[45] Dec. 9, 1975

[54] SPECTROPHOTOMETER FOR USE AS A SPLIT BEAM AND DUAL WAVELENGTH MEASUREMENTS

[75] Inventors: Tadashi Honkawa; Kenji Fukuda, both of Katsuta, Japan

[73] Assignee: Hitachi, Ltd., Japan

[22] Filed: Mar. 20, 1972

[21] Appl. No.: 235,925

[44] Published under the Trial Voluntary Protest Program on January 28, 1975 as document no. B 235,925.

[30] Foreign Application Priority Data
Mar. 19, 1971 Japan.............................. 46-15126

[52] U.S. Cl. ..................... 356/73; 356/88; 356/95; 356/97
[51] Int. Cl.² ..................... G01N 21/00; G01J 3/42

[58] Field of Search ............ 356/73, 88, 92, 93, 94, 356/95, 96, 97, 98, 101, 244

[56] References Cited
UNITED STATES PATENTS
| | | | |
|---|---|---|---|
| 2,503,165 | 4/1950 | Meyer | 356/93 |
| 3,666,362 | 5/1972 | Chance | 356/93 |
| 3,712,738 | 1/1973 | Yamamoto | 356/94 |

Primary Examiner—Vincent P. McGraw
Attorney, Agent, or Firm—Craig & Antonelli

[57] ABSTRACT

This spectrophotometer operates either as a spectrum scanning instrument or as a dual wavelength instrument. The conversion of the one type of spectrophotometer into the other is performed through a position change of cuvettes or an exchange of mirror blocks in the optical train thereof.

7 Claims, 1 Drawing Figure

SPECTROPHOTOMETER FOR USE AS A SPLIT BEAM AND DUAL WAVELENGTH MEASUREMENTS

BACKGROUND OF THE INVENTION

This invention relates to a spectrophotometer for use as a split beam and a dual wavelength instrument.

One conventional combined spectrophotometer was described in the article: Rikmanspoel: "Sensitive Absorption Spectrophotometer for Use as a Split Beam or as a Dual Wavelength Instrument," Review of Scientific Instruments, vol. 36, No. 4, April, 1965, pages 497–503. The conversion of the split beam type spectrophotometer into the dual wavelength type or vice versa in the conventional device is performed by adjusting swinging mirrors before cuvettes. However, the precise adjustment of the swinging mirrors in such an arrangement is quite difficult and time consuming, and the spectrophotometer requires adjusting means for this purpose which renders the structure of the spectrophotometer complicated.

SUMMARY OF THE INVENTION

One object of the present invention is to provide a combined spectrophotometer in which the conversion of the split beam type spectrophotometer into the dual wavelength type is performed easily without any adjustment of the optical train thereof.

Another object of the present invention is to provide a combined spectrophotometer having a simple structure.

A further object of the present invention is to provide a combined spectrophotometer through which both the split beam type measurement and the dual wavelength type measurement are performed efficiently.

The spectrophotometer of the present invention comprises a light source, optical means for defining two light paths for the light beams from said light source, a pair of Czerny-Turner grating monochromators of Ebert type monochromators for receiving the respective light beams from said optical means, a chopper for alternately interrupting the respective light beams in the respective light paths emerging from each monochromator, a first mirror block for directing the respective light beams in the respective light paths into the same light path, said first mirror block being interchangeable with a second mirror block for deflecting and condensing only the respective light beams in the respective light paths, a cuvette housing through which the respective light beams from said first and second mirror blocks pass, and a detector receiving the respective light beams from said cuvette housing.

DESCRIPTION OF THE PREFERRED EMBODIMENT

Figure 1:
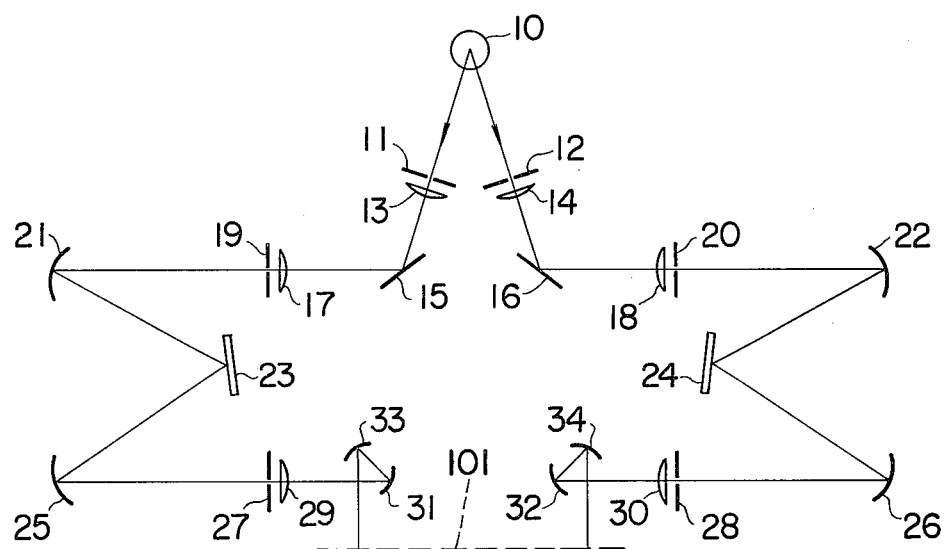
FIG. 1 is a schematic diagram of an optical train of the spectrophotometer of the present invention.

In FIG. 1, light beams emitted from a light source 10 are directed along two light paths. On each light path there are arranged slits or masks 11 and 12 for defining the sectional plane of each light beam, first focusing or condenser lenses 13 and 14, plane mirrors 15 and 16 for changing the direction of each light beam, first slit or entering field lenses 17 and 18, and entrance slits 19 and 20 of respective monochromators.

Each monochromator comprises collimator mirrors 21 and 22, dispersion or diffraction gratings 23 and 24, camera mirrors 25 and 26, and exit slits 27 and 28. At the output of each monochromator there are arranged second slit or exit field lenses 29 and 30, first spherical mirrors 31 and 32 and second spherical mirrors 33 and 34.

Each light beam or monochromatic beam reflected from the second spherical mirrors 33 and 34 is chopped alternately by a chopper 44, the chopping and the time sharing of the light beams is performed by rotating the chopper 44. After passing the chopper 44, one monochromatic beam enters into a first mirror block 60 through a second focusing or condenser lens 35 and a plane mirror 37. The other monochromatic beam also enters into the first mirror block 60 through a second focusing or condenser lens 36 and a plane mirror 39.

The first mirror block 60 consists of a plane mirror 38, a grating or semitransparent mirror 40 and a focusing or condenser lens 41. Through the first mirror block 60, a portion of both monochromatic beams are directed into the same light path and are directed to a cuvette housing 100 shown in dashed line where one sample cuvette 42 is mounted, and the intensities of both monochromatic beams are detected successively by a detector 43 through which the intensities are converted into electric signals. The electric signals are treated by A.C. signals in synchronism with the rotation of the chopper 44 and the intensity ratio of both monochromatic beams is recorded by a recorder (not shown). A portion of the monochromatic beams are directed onto cuvette housing by the semitransparent mirror or grating 40 which as is known transmits and reflects a portion of the light beams directed thereto with the remaining portion of the monochromatic light being directed away from the cuvette housing and detector along the path 80 shown in dashed line.

A pair of identical monochromators as described above may generate two monochromatic beams of different wavelengths or one monochromatic beam of the same wavelength through the dispersion or diffraction gratings 23 and 24. The embodiment explained above is a dual wavelength spectrophotometer.

When two cuvettes, one for reference, the other for sample, as shown by the dotted blocks 49 and 50 in FIG. 1, are mounted on a cuvette housing 101 shown in dashed line which is placed before the chopper 44, instead of mounting the cuvette on the cuvette housing before the detector 43, as explained above, and the wavelength of the two monochromatic beams emerging from both exit slits 27 and 28 is set equal by adjusting both diffraction gratings 23 and 24, the optical train of the dual wavelength spectrophotometer explained is converted to a split beam spectrophotometer without any other changes therein.

Figure 2:
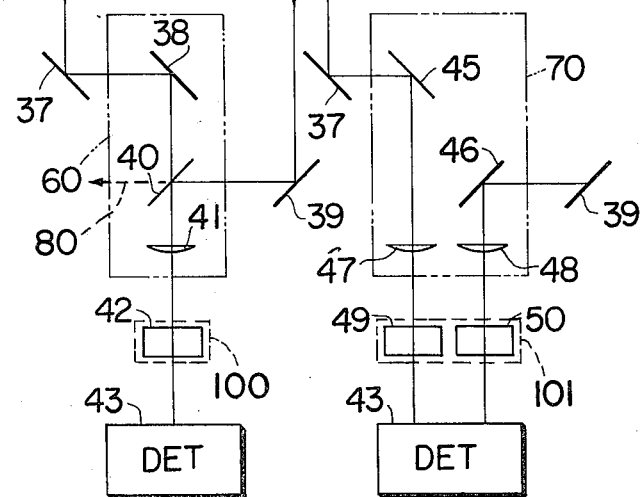
FIG. 2 is a schematic diagram of a second mirror block for use in place of the first mirror block of FIG. 1.

When spectrum scanning by the split beam measurement on a sample having high turbidity is required, it is necessary to place the sample closer to the detector 43. This requirement is attained as shown in FIG. 2. The first mirror block 60 is converted to a second mirror block 70 and the sample of high turbidity 49 and reference 50, as shown by solid block in FIG. 2, are placed just before the detector 43. The second mirror block 70 consists of plane mirrors 45 and 46 and focusing or condenser lenses 47 and 48. The one monochromatic beam deflected by the plane mirror 37 which enters into the second mirror block 70 is deflected by the plane mirror 45 focused by the focusing lens and directed to the cuvette housing 101 where the cuvette containing the sample of high turbidity is mounted. The other monochromatic beam deflected by the plane mirror 39 which enters into the second mirror block 70 is deflected by the plane mirror 46, focused by the focusing lens and directed to the cuvette housing 101 wherein the reference cuvette 50 is mounted.

In the embodiment of the present invention wherein the spectrometer is converted between a spectrum scanning instrument and a dual wavelength instrument by interchange of mirror blocks, such interchange can be facilitated by a mechanical apparatus (not shown) which permits a swinging of the mirror blocks on pivot arms to insure precise location and simplified handling of the blocks. Other types of apparatus, such as rotatable turrets, may also be used to exchange mirror blocks, or the individual blocks may simply be replaced by hand.

What is claimed is:

1. A spectrophotometer comprising a light source, optical means for directing the light beams from said light source along first and second paths, a pair of monochromators positioned along said first and second paths, respectively, for receiving the light beams from said optical means, a chopper for alternately interrupting the respective light beams in said first and second paths at the outputs of said monochromators, a first mirror block means separate from said chopper for receiving the interrupted light beams from said chopper and for directing a portion of the respective light beams in said first and second light paths into a common light path, a cuvette housing positioned at the output of said first mirror block means and through which said common light path extends, and detector means for receiving light from the output of said cuvette housing, said first mirror block means directing the remaining portion of respective light beams in said first and second light paths not directed into the common light path away from at least one of said cuvette housing and said detector means, whereby the presence of shielding means for interrupting the light beams is avoided and further including a second mirror block means interchangeable with said first mirror block means for separately deflecting and condensing the respective light beams in said first and second light paths from said chopper so as to direct the separate light beams onto said cuvette housing.

2. A spectrophotometer as defined in claim 1, further including first means for condensing and deflecting the respective light beams in said first and second light paths from said monochromators to said chopper and second means for condensing and deflecting the respective light beams in said first and second light paths from said chopper to said mirror block means.

3. A spectrophotometer as defined in claim 1, wherein said first mirror block means includes a plane mirror means receiving a light beam from one of said first and second paths, a grating means for receiving light beams from said plane mirror means and the other of said first and second paths, and a focusing means.

4. A spectrophotometer as defined in claim 1, wherein said second mirror block means comprises first and second plane mirror means and first and second focusing means, said first plane mirror means and said first focusing means deflecting and condensing the light beam in said first light path from said chopper and said second plane mirror means and said second focusing means deflecting and condensing the light beam in said second light path from said chopper.

5. A spectrophotometer comprising a light source, optical means for directing the light beams from said light source along first and second paths, a pair of monochromators positioned along said first and second paths, respectively, for receiving the light beams from said optical means, a chopper for alternately interrupting the respective light beams in said first and second paths at the outputs of said monochromators, one mirror block means separate from said chopper for receiving the interrupted light beams from said chopper for separately deflecting and condensing the respective light beams in said first and second light paths from said chopper, a cuvette housing positioned at the output of said one mirror block means and through which the respective light beams from said mirror block means passes, and detector means for receiving the respective light beams from the output of said cuvette housing, and further including another mirror block means interchangeable with said one mirror block means for receiving the interrupted light beams from said chopper for directing the respective light beams in said first and second paths into a common light path onto said cuvette housing.

6. A spectrophotometer as defined in claim 5, further including first means for condensing and deflecting the respective light beams in said first and second light paths from said monochromators to said chopper and second means for condensing and deflecting the respective light beams in said first and second light paths from said chopper to said mirror block means. cuvette 7. A spectrophotometer comprising a light source, optical means for directing the light beams from said light source along first and second paths, a pair of monochromators positioned along said first and second paths, respectively, for receiving the light beams from said optical means, first means for condensing and deflecting the respective light beams in the respective first and second light paths from said monochromators, a ccuvette housing through which the respective light beams from said first means pass, a chopper for alternately interrupting the respective light beams in said first and second paths from said cuvette housing, second means for condensing and deflecting the respective light beams in said first and second light paths from said chopper, a first mirror block means for receiving the respective light beams from said second means for directing a portion of the respective light beams in said first and second light paths into a common light path, and detector means for receiving the respective light beams from the output of said mirror block means, said mirror block means directing the remaining portion of respective light beams in said first and second light paths not directed into the common light path away from at least one of said cuvette housing and said detector means, whereby the presence of shielding means for interrupting the light beams is avoided, and further including a second mirror block means interchangeable with said first mirror block means for separately deflecting and condensing the respective light beams in said first and second light paths from said second means so as to direct the separate light beams onto said detector means.

* * * * *